United States Patent [19]

Aarts

[11] Patent Number: 4,951,496
[45] Date of Patent: Aug. 28, 1990

[54] METHOD OF, AND APPARATUS FOR, LEAK TESTING A PACKAGE

[75] Inventor: Mathias L. C. Aarts, Bilthoven, Netherlands

[73] Assignee: Product Suppliers AG, Zug, Switzerland

[21] Appl. No.: 307,933

[22] Filed: Feb. 9, 1989

[30] Foreign Application Priority Data

Feb. 9, 1988 [NL] Netherlands ............ 8800308

[51] Int. Cl.$^5$ .................. G01M 3/32
[52] U.S. Cl. ................... 73/49.3
[58] Field of Search ............ 73/49.3, 49.2, 52

[56] References Cited

U.S. PATENT DOCUMENTS

| | | | |
|---|---|---|---|
| 3,027,753 | 4/1962 | Harder, Jr. | 73/49.3 X |
| 3,805,595 | 4/1974 | Dobry | 73/49.3 |
| 4,055,984 | 11/1977 | Marx | 73/49.2 |
| 4,593,554 | 6/1986 | Aarts | 73/49.3 |
| 4,689,987 | 9/1987 | Aarts | 73/49.3 |

FOREIGN PATENT DOCUMENTS 1209569 9/1959 France ............ 73/49.3
2351400 12/1977 France .

Primary Examiner—John Chapman
Assistant Examiner—Joseph W. Roskos
Attorney, Agent, or Firm—Cushman, Darby & Cushman

[57] ABSTRACT

A method of, and apparatus for, leak testing a package, in which the package is placed in a sheet-like, gas-tight envelope. A pressure differential is generated between the outside and the inside of the envelope, as a result of which the package is closely enveloped by the envelope. This pressure differential is so large that it decreases the volume of the package and increases the internal pressure in a non-filled portion thereof. In a sealed measuring space defined between the package and the envelope pressed against it, a pressure is used which is lower than the increased pressure in the package. In the sealed measuring space, the pressure is measured for a pre-determined measuring period. An increase in pressure in the measuring space indicates leakage from the package.

8 Claims, 1 Drawing Sheet

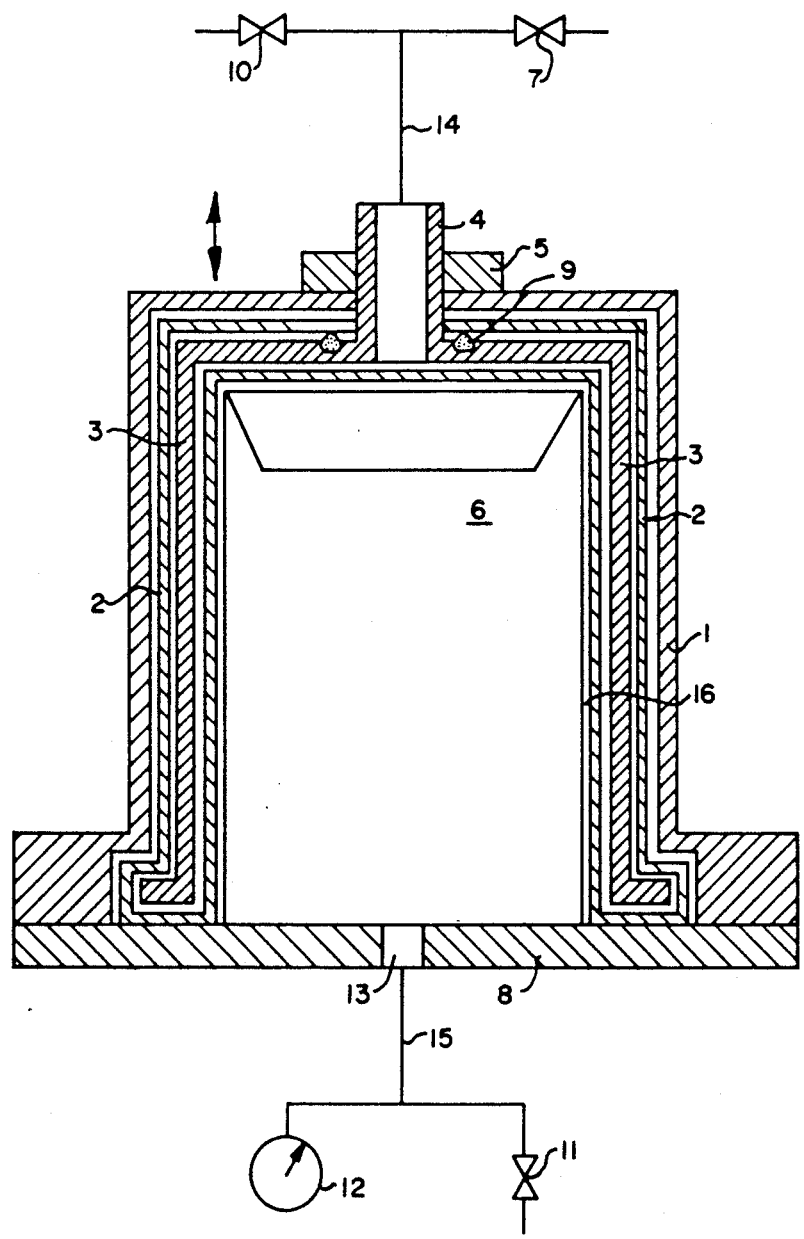

METHOD OF, AND APPARATUS FOR, LEAK TESTING A PACKAGE

BACKGROUND OF THE INVENTION

This invention relates to a method of leak testing a package, which comprises placing the package in a sheet-like gas-tight envelope, effecting a differential between the pressure on the outside and the pressure on the inside of the envelope so that the package is tightly enveloped by the envelope, sealing the space ("measuring space") between the package and the envelope pressed against it, and measuring the change in pressure in the sealed measuring space for a predetermined measuring time.

A similar method is disclosed in Aarts, U.S. Pat. No. 4,593,554, issued June 10, 1986. According to that method, a vacuum package is tested for possible leakage by placing the package in a gas-tight and flexible envelope, whereafter pressure is exerted on the outside of the envelope. This pressure serves for causing the envelope to bed down accurately against the circumference of the package, so that only a minute space remains between the envelope and the package. The envelope must not seal a leak which may be present in the package, and, according to the patent application, therefore, the pressure on the envelope should be relatively low. In the space or measuring space referred to a pressure is permitted, normally the atmospheric pressure of the ambient air, which is higher than that in the vacuum package. At that pressure, the measuring space is sealed from the surroundings, whereafter possible changes in pressure within the measuring space are measured for a pre-determined period of time. If there is leak in the vacuum package, these pressure changes will be a decrease in pressure as a result of gas flowing from the measuring space into the vacuum package.

The prior method is limited to the testing of vacuum packages, and cannot be used, without more ado, for testing packages within which the pressure is atmospheric. Summary of the Invention It is an object of the present invention to provide a method of the above kind, by which, in particular, atmospheric packages can be leak tested.

To that effect, the method according to the invention is characterized in that said pressure differential is so high that the envelope reduces the volume in the package and increases the internal pressure in the non-filled portion of the package, and that a lower pressure than the increased internal pressure in the package is used within the measuring space.

The invention also relates to apparatus for leak testing a package by the above method, comprising a sheet-like gas-tight envelope for receiving the package to be tested, means for supplying a gas or liquid to the outside of the envelope for causing the package to be tightly enveloped by the envelope, sealing means for sealing the space ("measuring space") between the package and the envelope pressed against it from the ambient air, and measuring means for measuring the pressure in the sealed measuring space, characterized in that said means are arranged for the supply of such a pressure that the envelope pressed against the package decreases the free volume of the package and increases the internal pressure within the package, and that means are provided for providing a lower pressure within the measuring space than the increased internal pressure within the package.

For practical reasons, it is desirable for said lower pressure within the measuring space to be the atmospheric pressure of the ambient air. For testing atmospheric packages by the prior method there is then the disadvantage that there is no difference between the pressure within the package and that within the measuring space, so that the presence of a leak cannot be observed by measuring pressure variations within the sealed measuring space. According to the present invention, the envelope is pressed against the package with such a high pressure that the package is slightly compressed, unlike the testing of the vacuum package, in which the envelope just comes to lie in close contact with the package. Owing to the compression of the package, its volume is slightly decreased, resulting in an increase in pressure. In particular in the case of packages in which only a relatively small portion is not filled with product, the increase in pressure can be relatively large with minor compression. As a consequence, a superatmospheric pressure is created within the originally atmospheric package. When the package is leaky, air from the package will flow into the measuring space and there increase the pressure, which is measured as an indication that there is a leak. Accordingly, this flow is contrary to that which occurs in the prior method in leak testing a vacuum package, in which in fact, if the package is leaky, the air will flow from the measuring space into the package.

Although, as stated before, the use of an atmospheric reference pressure in the measuring space is preferred, the difference in pressure between the measuring space and the package may, if desired, be increased further by using a subatmospheric pressure within the measuring space. This feature can be used, for example, if the contents of the package are vulnerable, and hence the package can be compressed to an insufficient extent for creating a sufficiently large pressure differential between package and atmospheric measuring space. In this connection it should be considered that, with the measurement being equally reliable, the measuring time may be shorter when there is a greater pressure differential between package and envelope.

The invention can also be used for testing vacuum packages, in which case the pressure within the sealed measuring space should have a sub-atmospheric value lower than that within the vacuum package. Naturally, packages with a super-atmospheric filling can be tested as well.

Some products are packed in a double-walled package: an inner package, or liner, which is filled with product, and an outer package lying in close contact with the inner package. In such cases, it may be possible for the space between the two packages, which is very small as it is, to be used as the measuring space in the present testing method, in which case this inner space should of course be, or be made, accessible from the outside. As the outer package used as the "envelope" within the meaning of the present invention is already in close contact with the inner package or liner, a relatively slight outer pressure on the outer package will often be all that is necessary for compressing the package. As a consequence, the invention is also effectively usable with such double-walled packages packing fragile products, such as consumption chips.

In view of the nature of the invention, it is in particular suitable for testing air-tight bags containing granular or other loose bulk material, such as non-vacuum packed, ground or non-ground coffee beans, peanuts and cocktail biscuits, and the like, packed in a flexible paper or plastic foil.

Possibly against expectation, even with a relatively high pressure of the envelope against the package, any leaks present therein are not sealed by the envelope. If desired, it can be promoted that any leaks remain open by the selection of the material and the composition of the envelope. Partly in this connection reference is made to the examples of possible envelopes mentioned in the above mentioned U.S. patent of Aarts, which are all also suitable in the present invention. In most cases, a thin-walled, elastic and gas-tight rubber foil will be a very satisfactory envelope. Naturally, it is desirable for the form of the envelope to be more or less adapted to the form of the package to be tested therein. The envelope will mostly be bag-shaped. A bag-shaped envelope is preferably double-walled, with the inner and outer walls of the bag meeting at the open end of the bag,, where they seal the space between the two walls. In this space, a rigid frame may be incorporated, which in essence has the same shape as the bag. This construction of the envelope, described in more detail in European patent application no. 86201251.5, is also used in the apparatus shown in the accompanying drawings.

In some packages, for example, those containing ground coffee, a degasing valve may be provided in the wall of the package. This valve permits the passage of gas in one direction only, namely, from the package to the outside. The escape of gas from the package through the valve during the testing of the package should be prevented. For this purpose, the envelope may be provided with a small thickning or bulge at the proper location, which keeps the valve closed. Alternatively, a sealing ring may be secured to the wall of the envelope at that location, which is pressed by the envelope around the valve against the package, and seals the zone around the valve of the measuring space.

The pressure differential between the outside and the inside of the envelope, required for compressing the package to the desired extent can be determined empirically for each individual case. Mostly, the pressure differential should be greater than about 100 mbar. A pressure differential in the order of 300 mbar will be satisfactory in many cases. Usually, the pressure on the inside of the envelope will be atmospheric, in which case a pressure of 1300 mbar is used on the outside of the envelope. Naturally, as required, any higher or lower suitable pressure differential can be used. The outside pressure can be obtained by supplying a liquid, but preferably by supplying air.

In many cases, the internal pressure within the package during the compression will rise to a value which is equal or substantially equal to the pressure differential acting on the envelope. If, as is commonly the case, the measuring space, before being sealed, is in communication with the atmospheric surroundings, this means that the internal pressure within the atmospheric package can increase to the pressure exerted on the outside of the envelope.

As the measuring space is of very small volume, and is only a fraction of the free space within the package, the increase in pressure within the sealed measuring space as a result of a leak in the package will be relatively large. As a result, a possible leak in the package can commonly be determined within a short measuring period of only a few seconds.

Description of the Drawing

The invention will now be described, by way of example, with reference to the accompanying drawing, which illustrates diagrammatically, in vertical cross-sectional view, an apparatus for leak testing a package.

Detailed Description

The drawing shows a carrying plate 8 on which a package 6 to be tested has been placed. Provided over carrying plate 8 is a bell 1, which can be moved vertically to and from plate 8. Disposed within bell 1 is a thin-walled rubber envelope 2. Envelope 2 is of the double-walled type, with a rigid frame 3 placed between the two walls. The shape of envelope 2 with the frame corresponds substantially with the shape of the package to be tested. Connected to frame 3 is a tubular member 4 which is screw threaded on the outside. By means of a nut 5, the tubular member 4 and hence the entire frame with the envelope is secured to bell 1 in an adjustable manner. A sealing ring 9 is placed to provide a seal between the top of the outer wall of the envelope and the frame. The internal space within envelope 2 is connected through the tubular member 4 to a conduit 14 which through a valve 7 can be connected to a source of vacuum or through valve 10 to a source of compressed air. Formed in carrying plate 8 is a central aperture 13 connected to a line 15. Line 15 can be connected through a valve 11 to the ambient air. Connected to line 15 is a pressure gauge 12. For testing an atmospheric package 6, bell 1 is raised from plate 8 a distance sufficient to permit the package to be placed on the plate. Subsequently bell 1 is lowered onto the plate. To enable the bell with the envelope to readily slide over the package during this downward movement, the space within the envelope may, if desired, first be evacuated by opening valve 7. This will cause the envelope to be pressed against the frame and there will be more clearance between the envelope and the package.

When bell 1 rests on plate 8, valve 7 is closed and valve 10 is opened to supply compressed air to the envelope. As a consequence, the inner wall of the envelope is pressed again into contact with the package. At the same time, the lower part of the envelope resting on the carrying plate is pressed into contact with the plate, whereby the space between the package and the envelope is sealed. The pressure of the compressed air admitted into the envelope is sufficiently high not only to cause the envelope to envelop the package closely, but also to cause the package to be slightly compressed, so that the pressure within the package is increased. In spite of the fact that the space 16 has become very small, there continues to be communication through the bottom of the package with aperture 13 in the carrying plate.

During the operations described above, valve 11 has been opened, and thus the space is continuously in communication with the ambient air and thus retains atmospheric pressure. Valve 11 is now closed, so that space 16, now the measuring space, is also sealed from the surroundings. On pressure gauge 12 it can now be observed whether the pressure within the measure space 16 is increased as a result of a leak in the package.

It will be clear that for an industrial application of the invention for testing large series of continuously supplied packages, the operation of the apparatus and the detection of possibly leaky packages can be fully automated.

What I claim is:

1. A method of leak-testing a package, which comprises:
   (a) placing a compressible package within a sheet-like, gas-tight envelop so as to define a measuring space between the package and the envelope,
   (b) effecting a differential between the pressure on the outside and the pressure on the inside of the envelope so that the package becomes tightly enveloped by the envelope,
   (c) sealing the measuring space between the package and the envelope pressed against the package, thereby providing an initial pressure in the sealed measuring space, and
   (d) measuring the change in pressure in the sealed measuring space for a pre-determined measuring time,
   said pressure differential effected in step (b) being so high that the envelope reduces the volume in the package and thereby increases the internal pressure in the non-filled portion of the package, a lower pressure than the increased internal pressure created in the package in step (b) provided within the measuring space in step (c) as said initial pressure.

2. A method as claimed in claim 1, wherein:
   in step (b) the internal pressure in the package is increased owing to the compression of the envelope against the package until the internal pressure equals the pressure differential acting on the envelope.

3. A method as claimed in claim 1, wherein:
   said pressure differential is greater than 300 mbar.

4. A method as claimed in claim 3, wherein:
   said pressure differential is obtained using atmospheric pressure on the inside of the envelope and by using a pressure higher than 1300 mbar on the outside of the envelope.

5. A method as claimed in claim 1 wherein:
   said initial pressure in the measuring space is atmospheric pressure.

6. A method as claimed in claim 1, wherein:
   said initial pressure in the measuring space is sub-atmospheric pressure.

7. A method as claimed in claim 1, wherein:
   said package when having said initial internal volume has an internal pressure which is substantially equal to atmospheric pressure.

8. Apparatus for leak testing a package by a method which includes:
   (a) placing a compressible package within a sheet-like, gas-tight envelope so as to define a measuring space between the package and the envelope,
   (b) effecting a differential between the pressure on the outside and the pressure on the inside of the envelope so that the package becomes tightly enveloped by the envelope,
   (c) sealing the measuring space between the package and the envelope pressed against the package, thereby providing an initial pressure in the sealed measuring space, and
   (d) measuring the change in pressure in the sealed measuring space for a pre-determined measuring time,
   said pressure differential effected in step (b) being so high that the envelope reduces the volume in the package and thereby increases the internal pressure in the non-filled portion of the package, a lower pressure than the increased internal pressure created in the package in step (b) is provided within the measuring space in step (c) as said initial pressure,
   said apparatus comprising:
   a sheet-like, gas-tight envelope for receiving the package to be tested,
   means for supplying a gas or liquid to the outside of the envelope for causing the package to be tightly enveloped by the envelope,
   sealing means for sealing the measuring space between the package and the envelope pressed against it from the ambient air, and p2 measuring means for measuring the pressure in the sealed measuring space,
   said supplying means being arranged for the supply of such a pressure that the envelope when pressed against the package decreases the free volume of the package and increases the internal pressure within the package, and said supplying means, in use, provides a lower pressure within the measuring space than the increased internal pressure within the package.

* * * * *